Patented July 28, 1931

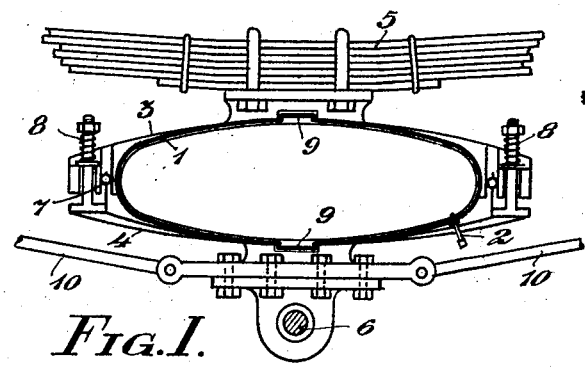
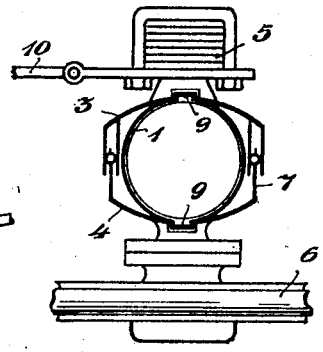
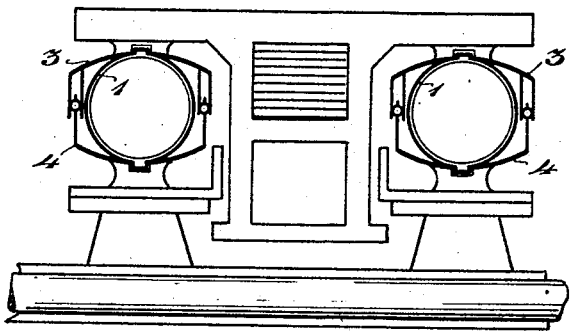
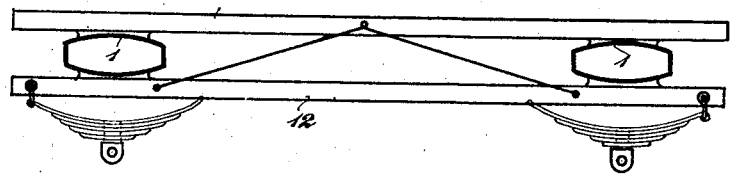
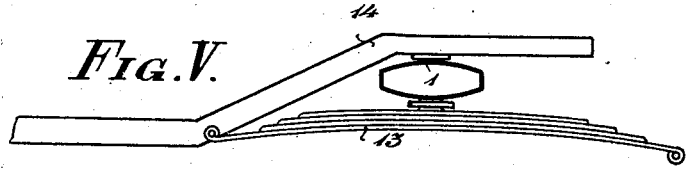
Emilio Lenhardtson
INVENTOR

1,815,924

UNITED STATES PATENT OFFICE

EMILIO LENHARDTSON, OF BUENOS AIRES, ARGENTINA

SUSPENSION OF VEHICLES

Application filed October 14, 1927. Serial No. 226,075.

This invention relates to improvements in pneumatic shock absorbers used between the body and wheel axles of a motor vehicle.

The object of the present invention is to produce certain improvements in the suspension elements of vehicles, specially motorcars, motor trucks or lorries and the like, to permit the use of solid tires on the wheels, without making any apparent difference in the riding qualities over the ordinary pneumatic tires now in use, and at the same time deriving all of the benefits inherent to hard tires.

Briefly the invention consists of pneumatic shock absorbers interposed between the springs, chassis or frame, and the wheels of the vehicle, or at any other suitable point, in such a manner that the same elasticity is obtainable with solid tires as with common pneumatic tires, the pneumatic shock absorbers absorbing the vibration caused by rough and uneven roads, and assuring comfort to the passenger.

My improved shock-absorbers consist of an inner chamber inflated with air or pressure fluids and enclosed in an outer chamber made of material similar to that used in the manufacture of pneumatic tires. The whole is encased in cups, containers, or movable caps, which are interposed between the common springs and axles of the wheels, or between the chassis and the springs, or between two frames disposed and constructed according to the resistance and work required of the vehicle.

I accomplish the objects of my invention by means of the apparatus illustratively exemplified in the accompanying drawings, in which Fig. I is a longitudinal section, of the shock-absorber device, disposed between the axle and the common spring of a vehicle.

Fig. II is a transverse sectional view of same.

Fig. III is a transverse section of a modification of the device, in which two chambers are symmetrically arranged with relation to the spring, obtaining thereby greater stability and diminishing the height of the apparatus.

Fig. IV illustrates the shock absorber device positioned between frame and body members.

Fig. V illustrates the shock absorber used in a cantilever spring suspension.

Referring to the drawings (1) is the pneumatic chamber made of material similar to that used in common pneumatic tires. In the drawings it has the shape or form of an ellipsoid, with transverse circular section.

The diameter of this circle and the length of the shock-absorber, are determined according to the weight and other characteristics of the vehicle. This chamber is inflated by means of valve (2) with pressure similar to that given to common pneumatic tires.

The form of the pneumatic chamber (1), as well as the dimensions and air pressure, can be likewise modified according to the characteristics of the vehicle which it is to be used for.

The valve (2) is the same as those actually used in the air chambers of motorcars.

This pneumatic chamber (1) is contained between an upper cup (3), and a lower one (4), the internal surfaces of which nearly coincide with chamber (1). When in a state of equilibrium cups (3) and (4) shall only bear or press on the chamber in a small central sector.

The remaining internal surfaces of the cups have a curvature radius somewhat larger, in order to give play to the chamber (1) when alterations are produced in the external pressure on the cups.

The upper cup (3) in Fig. I, supports a spring (5) of the vehicle.

The lower cup (4) rests on a journal bearing of the axle (6) of the vehicle.

In the drawings the upper cup has been indicated with a female socket to serve as a guide allowing vertical movements, but avoiding horizontal displacements.

On the lower cup are spring members 7 fitting into the socket in the upper cup to avoid noise that the movement would produce, and to make the sliding movements between the cups, more springy.

These springs (7) should be lubricated with grease.

To augment the rigidness of the apparatus horizontally, and to avoid the cups being dislodged from their places by bumping movements, a bolt (8) has been provided at each end, with a nut and pressure spring, that tends to keep upper cup (3) in its place, limits the total lifting of the same, but freely permits the downward movement of cup (3).

A belt and buckle can also be added to encircle the whole but has been omitted in the drawing to avoid confusion.

On the surface of the outer cover of the pneumatic chamber (1) two protuberances (9), of same material as the cover, are placed, that will fit respectively in cavities in the cups (3) and (4).

These protuberances will avoid the displacement of these chambers within the cups and will contribute to the horizontal rigidness of the whole.

In the form shown in Figures I and II stay rods (10) have been placed, that join the lower cup and the axle with the chassis or frame of the car, so as to support heavy horizontal knocks.

These stay rods are reinforced with spring bearings to allow a certain amount of play.

All these accessories vary according to the type of vehicle and are secondary to the invention, for which reason I do not consider it necessary to give further details.

As can be seen in Fig. III, a shock-absorbing system has been formed by two chambers symmetrically placed with relation to the spring. This will give great stability to the connection and diminish the height of the apparatus.

In Fig. IV is indicated another possible disposition between two frames (11) and (12).

Fig. V shows the shock-absorbing device placed between the spring (13) and the chassis (14).

With this simple description, the possibility of adapting this device to an infinite number of analogous cases, can be observed.

The shape, material, and most convenient dimensions of the parts and accessories of the apparatus should be decided on in each case, according to the characteristics of each vehicle.

My new device absorbs the vibration and shock caused by rough roads. supplanting pneumatic tires on the rims of the wheels by standard wheels with solid tires; the position in which it is fixed, avoids all kinds of friction and wear, as it has no contact whatsoever with the ground, and liability of puncture or blow out is almost impossible, at any rate highly improbable, which is very much the contrary with ordinary pneumatic tires, and, moreover, its cost is infinitely less.

Having now particularly described and specified the nature of my invention and the manner in which it is to be used, what I claim as my exclusive invention and property, is:

In a shock absorber for vehicles, the combination with a substantially elliptical upper cup member having an internally indented block at its upper intermediate part, of a lower similar cup member having an internally indented block at its lower intermediate part, an inflatable chamber enclosed by said cups and having diametrically opposite projections extending into the indentations in said cup members, said cup members having laterally arranged interengaging sliding surfaces to allow for relative movement of said cup members, spring means for yieldingly limiting the extent of relative movement of the cups, a vehicle spring secured to the upper block and a part of the chassis secured to the lower block.

EMILIO LENHARDTSON.